F. LOBNITZ.
LUBRICATOR FOR SUBMERGED BEARINGS.
APPLICATION FILED NOV. 30, 1912.

1,107,806.

Patented Aug. 18, 1914.
2 SHEETS—SHEET 1.

F. LOBNITZ.
LUBRICATOR FOR SUBMERGED BEARINGS.
APPLICATION FILED NOV. 30, 1912.

1,107,806.

Patented Aug. 18, 1914.
2 SHEETS—SHEET 2.

UNITED STATES PATENT OFFICE.

FRED LOBNITZ, OF CROOKSTON, SCOTLAND.

LUBRICATOR FOR SUBMERGED BEARINGS.

1,107,806.   Specification of Letters Patent.   Patented Aug. 18, 1914.

Application filed November 30, 1912. Serial No. 734,249.

*To all whom it may concern:*

Be it known that I, FRED LOBNITZ, a subject of the King of Great Britain, residing at Crookston, Renfrewshire, Scotland, have invented certain new and useful Improvements in Lubricators for Submerged Bearings, of which the following is a specification.

At present considerable difficulty is experienced in efficiently lubricating the bearings of bodies rotating under water owing to the fact that the water pressure tends to force back the lubricant and deprive the bearing of its proper supply and also to force sand or other gritty substance into the bearing and damage the same.

Under this invention I provide means whereby the lubricant is fed to the bearing by the action of fluid pressure (preferably compressed air) the pressure being caused to increase and diminish automatically as the pressure of the water, in which the rotating body works, increases and diminishes. In some cases instead of arranging for the automatic variation of pressure on the lubricant, as before described, I may arrange for the pressure being regulated by the operator in charge.

If so desired the pressure acting on the lubricant may be shown on a gage fitted in the pilot house or in other suitable place.

The invention is specially suitable for those parts of a dredger which work under water, such as the bottom tumbler of a bucket dredger or the rotating cutter of a suction dredger.

In order that the invention may be clearly understood I have shown, by way of example, on the accompanying drawings, a mode of carrying out the invention.

Figure 1:
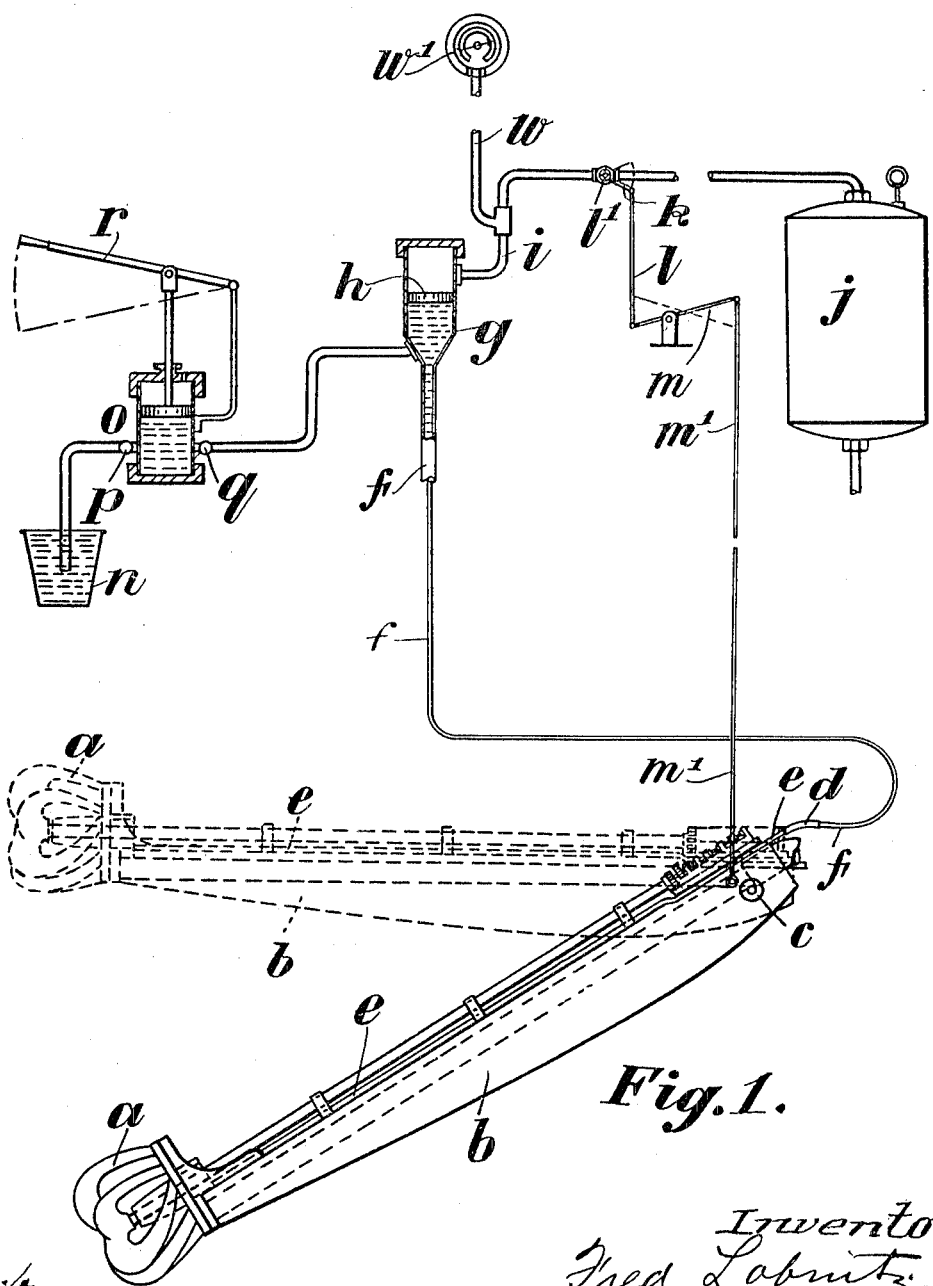
Figure 2:
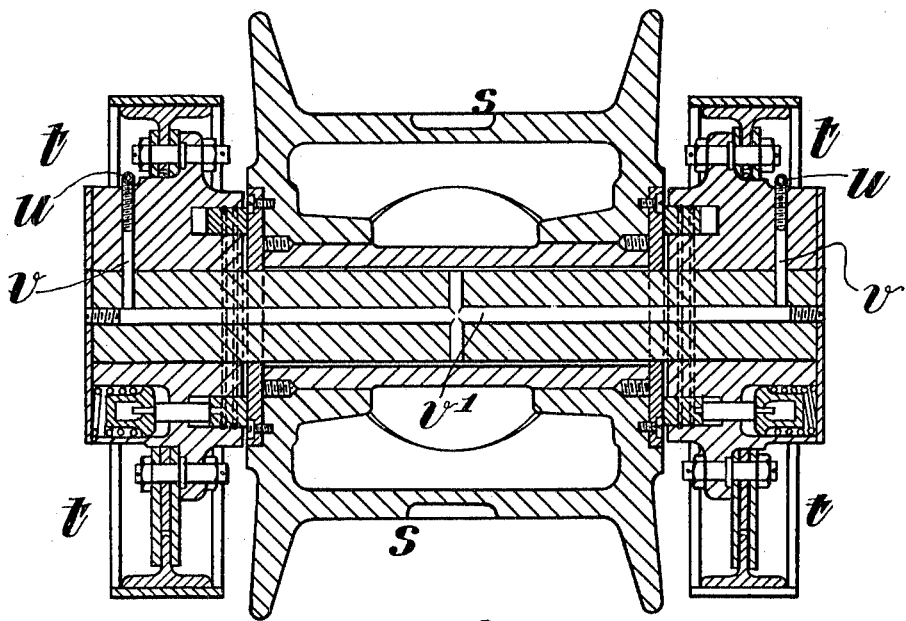

On the drawings:—Figure 1 represents a diagrammatic view of the lubricating device as applied to the rotating cutter shaft of a suction dredger, the lubricating device being shown to a much larger scale than the cutter shaft for the sake of clearness. Fig. 2 shows, in section, a bottom tumbler with the passages for supplying lubricant to the bearing.

The upper parts in Fig. 1 are enlarged very much out of proportion to the ladder at the bottom of this figure.

On the drawings the same reference letters wherever repeated indicate the same or similar parts.

The rotary cutter of a suction dredger and the bottom tumbler of a bucket dredger are carried on ladders which are raised and lowered as required. Of course the deeper the cutter or tumbler is lowered into the water the greater will be the water pressure acting on it. I utilize the movements of the ladder to automatically control the supply of pressure fluid to the lubricating device and thereby to regulate the pressure acting on the lubricant.

$a$ is the rotary cutter, $b$ the ladder, $c$ the ladder trunnion and $e$ a pipe conveying lubricant to the bearing of the cutter.

I connect the pipe $e$ by a flexible coupling $d$ to a pipe $f$ leading to a lubricating device $g$ (on any suitable part of the dredger) this device having a floating piston $h$ therein which is pressed downward by compressed air admitted to the device, through the pipe $i$ which latter communicates with a compressed air reservoir $j$ and the pressure in which is constantly maintained in any well known manner. On the pipe $i$ is a cock $l^1$ operated by an arm $k$ which latter is connected by a link $l$ to a lever $m$ which, again, is connected by a link $m^1$ to the ladder $b$ in such manner that, as the ladder is moved (the maximum movement is usually 45°) the link mechanism will be operated and the cock $l'$ opened or closed, more or less, so as to give an increased or diminished supply of compressed air to the lubricating device. The arrangement may be such that when the ladder is in the horizontal or up position (see dotted lines Fig. 1) the compressed air is cut off and when it is in the lowest position (see full lines Fig. 1) the compressed air is full on.

The lubricating device $g$ is of cylindrical shape with a tapered lower end. It is preferably filled, as required, from a bucket $n$ by means of a hand pump $o$ provided with a non-return valve $p$ and an outlet valve $q$. Of course, as the pump is operated by means of the lever $r$ lubricant is drawn from the bucket $n$ into the pump and then forced out again to the device $g$ so as to charge the same.

In Fig. 2 I have shown a bottom tumbler $s$ which is carried by its ladder $t$ and is supplied with lubricant by two branch pipes $u$, $u$, communicating with a pipe carried along the ladder and connected with a lubricating device $g$ as before. The lubricant passes by the passages $v$, $v^1$, to the bearing.

If so desired instead of moving the control cock $l^1$ automatically it may be moved by hand as and when desired.

A pipe $w$ may be carried up to the pilot house of the dredger and have a gage $w^1$ thereon which will indicate the pressure acting on the lubricant.

Having now fully described my invention what I claim and desire to secure by Letters Patent is:—

1. Means for lubricating the bearing of a rotating body working under water, comprising, a device for holding lubricant, means for conducting lubricant from the device to the bearing, a piston in the device and acting on the lubricant, means for supplying pressure fluid to the device and means for automatically controlling the supply of pressure fluid to the device according to the position of the rotating body under the water.

2. Means for lubricating the bearing of a rotating body working under water, comprising, a device for holding lubricant, means for conducting lubricant from the device to the bearing, a piston in the device and acting on the lubricant, means for supplying pressure fluid to the device and means for regulating the supply of pressure fluid according to the depth of the rotating body under the water.

3. Means for lubricating the bearing of a rotating body working under water, comprising, a device for holding lubricant, means for conducting lubricant from the device to the bearing, a piston in the device and acting on the lubricant, a pressure fluid source, and means for varying the supply of pressure fluid from said source to the device according to the position of the rotating body in the water.

4. Means for lubricating the bearing of a rotating body working under water, comprising, a device for holding lubricant, means for conducting lubricant from the device to the bearing, and means for causing the lubricant to be supplied to the bearing under increased or diminished pressure according to the position of the rotating body under the water.

5. Means for lubricating the bearing of a rotating body working under water, comprising, a device for holding lubricant, means for conducting lubricant from the device to the bearing, and means for causing the lubricant to be supplied automatically to the bearing under increased or diminished pressure according to the position of the rotating body under the water.

In testimony whereof I affix my signature in presence of two witnesses.

FRED LOBNITZ.

Witnesses:
JAMES R. WOOD,
C. A. DICKSON.

---

Copies of this patent may be obtained for five cents each, by addressing the "Commissioner of Patents, Washington, D. C."